United States Patent
Hamilton et al.

(10) Patent No.: US 6,209,125 B1
(45) Date of Patent: Mar. 27, 2001

(54) METHOD AND APPARATUS FOR SOFTWARE COMPONENT ANALYSIS

(75) Inventors: Graham Hamilton, Palo Alto; Laurence P. G. Cable, Mountain View, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 08/868,290

(22) Filed: Jun. 3, 1997

(51) Int. Cl.[7] ....................................................... G06F 9/45
(52) U.S. Cl. ................................................................ 717/4
(58) Field of Search ................................. 395/704; 717/4

(56) References Cited

U.S. PATENT DOCUMENTS

| | | | | |
|---|---|---|---|---|
| 5,689,711 | * | 11/1997 | Bardasz et al. | 717/1 |
| 5,784,583 | * | 7/1998 | Redpath | 395/353 |
| 5,794,178 | * | 8/1998 | Coid et al. | 704/9 |
| 5,805,885 | * | 9/1998 | Leach et al. | 395/683 |
| 5,842,220 | * | 11/1998 | DeGroot et al. | 707/103 |
| 5,878,425 | * | 3/1999 | Redpath | 707/102 |
| 6,002,395 | * | 12/1999 | Wagner et al. | 345/333 |

OTHER PUBLICATIONS

Helm et al., Integrating Information Retrieval and Domain Specific Approaches for Browsing and Retrieval in Object–Oriented Class Libraries, ACM, p. 47–61, 1991.*

Creech et al., Using Hypertext In selecting Reusable Software Components, Hypertext '91 Proceedings, p.25–38, Dec. 1991.*
Consens et al., Visualizing and Querying Software Structures, ACM, p. 138–156, 1992.*
Henninger, Retrieving Software Objects in an Example–Based Programming Environment, ACM, P. 251–260, 1991.*
Morrison et al., How to Program JavaBeans, p. 6–7, 36–40, May 1997.*
Morrison, Presenting JavaBeans, ITKnowledge.Com, Chap. 5 p. 1–13 and Chap 8 p. 1–8, Mar. 17, 1997.*

* cited by examiner

Primary Examiner—Kakali Chaki
Assistant Examiner—John Q. Chavis
(74) Attorney, Agent, or Firm—Beyer Weaver & Thomas, LLP

(57) ABSTRACT

Methods, software, and apparatus for analyzing a software component within an application builder tool are disclosed. The present invention relates, in one aspect, to a method for analyzing a software component that can be visually moved within an application builder tool running on a computer. The method involves obtaining the software component to be analyzed and determining if the software component has an associated information class. When it is determined that the software component has an associated information class, the information class is queried about information stored within the information class, otherwise automatic analysis using design patterns is applied to analyze the class. In one embodiment, the information stored within the information class relates to methods, properties, and/or events.

12 Claims, 9 Drawing Sheets

METHOD AND APPARATUS FOR SOFTWARE COMPONENT ANALYSIS

BACKGROUND OF THE INVENTION

1. Field of Invention

The present invention relates generally to methods and apparatus for use in application builder tools More particularly, the present invention relates to methods and apparatus for inspecting software components.

2. Background

As computer usage becomes increasingly widespread, the desire for custom computer applications which are specific to the needs of a particular user is also increasing. The use of visual builder tools, or application builder tools, enables computer applications to be readily created. Builder tools generally include standard sets of software modules which may be interlinked to create custom-built applications.

Many visual based applications builder tools, as for example Visual Basic available from Microsoft, Inc. of Redmond, Wash., have a graphical user interface which includes a "toolbox", a "form window", and a "property sheet". A toolbox typically contains icons which represent different classes of components, or software modules. Alternatively, the toolbox may contain text which represents different classes of components. It should be appreciated that many different classes of components may exist. By way of example, different classes may include complex components, e.g., database viewers, and simple components, e.g., buttons. A form window is a display window in which an application may be composed. A component selected from the toolbox may be "dropped", or otherwise placed, within the form window. A property sheet displays properties, or attributes, relating to the selected component. The properties may include, but are not limited to, information relating to the size, color, and name of the selected component.

Once components are placed in the form window, the components may be linked together to create an application. In other words, an application may be graphically composed by interlinking components in the form window. In an application builder environment, as well as at runtime, it is necessary to determine which methods, properties, and events are supported by a given class, or, more specifically, a component which is a part of the given class. A method is generally a procedure which is accessible to components other than the component with which the procedure is associated. A property may be defined as an attribute that is associated with a component. An example of a property, as previously mentioned, is the size of a component. An event is generally a mechanism which enables a component, e.g., a source object, to notify other components, e.g., listener objects, of state changes.

The process of identifying the methods, properties, and events which are supported by a particular class, or component, is conventionally considered to be an inspection of the component. It should be appreciated that the component itself is not typically inspected in order to identify the methods, properties, and events which are supported by the component. Rather, a component descriptor file that is associated with the component is inspected.

Components are typically created using a standard programming language, as for example the C++ programming language, while component descriptor files are usually created using a specification language such as an Interface Definition Language (IDL). A component descriptor file is a file which identifies methods, properties, and events that are supported by the component with which the component descriptor file is associated. Therefore, in order for a programmer to both create a component and provide a description of that component, the programmer must master both a standard programming language, e.g., C++, and an interface definition language. This process of mastering two languages often proves to be time-consuming and, as a result, inefficient. Further, the component description must be compiled down to a type library which describes the implementation of the component. That is, a binary description for the component must be created such that different portions of a program or an application may inspect the binary description to determine the implementation of the component. This binary description must then be updated each time a component is changed, which is time-consuming and, therefore, often proves to inefficient. What is needed, therefore, is an efficient apparatus and process which allows application builder tools to readily identify the methods, properties, and events which are supported by a particular class.

SUMMARY OF THE INVENTION

The present invention relates, in one aspect, to a method for analyzing a software component within an application builder tool. The method for analyzing a software component that may be visually moved within an application builder tool involves first obtaining the software component that is to be analyzed. Once the software component is obtained, a determination is made regarding whether the software component has an associated information class. If the software component has an associated information class, a query is made for information stored within the information class. In one embodiment, the information stored within the information class includes methods, properties, or events.

In another embodiment, when it is determined that the software component does not have an associated information class, a set of methods associated with a first class is identified. Then, at least one design pattern is applied to identify a first property that is associated with the software component. In such an embodiment, applying at least one design pattern to identify the first property associated with the software component involves searching for at least one method which defines the first property.

In accordance with another aspect of the present invention, a computer system for collecting information associated with a software component includes a computer which holds a builder tool that is arranged to analyze the software component. The computer is arranged to obtain the software component that is to be analyzed by the builder tool. The software component is part of a first class, and is visually manipulatable. The computer is used to determine if the software component has an associated information class. An associated information class includes methods, properties, and/or events. The information class is queried about information stored therein when there is an associated information class.

In one embodiment, the computer is also used to identify a set of properties, methods, or events associated with the first class if an associated information class is not in existence. Then, at least one design pattern is applied to identify a first property, method or event, respectively, that is associated with the software component. In another embodiment, the software component and the information class are created using the same language. In such an embodiment, the software component is a Java™ Bean and the information class is a BeanInfo class.

According to yet another aspect of the present invention, a software component that may be visually moved within a builder tool running on a computer includes an information class and methods, properties, and/or events that are defined by the information class and supported by a first class. In one embodiment, the methods, properties, and/or events are accessible to a second class that is separate from the first class.

These and other advantages of the present invention will become apparent upon reading the following detailed description and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Certain embodiments of a method and apparatus for inspecting software components will be described below making reference to the accompanying drawings.

Figure 1:
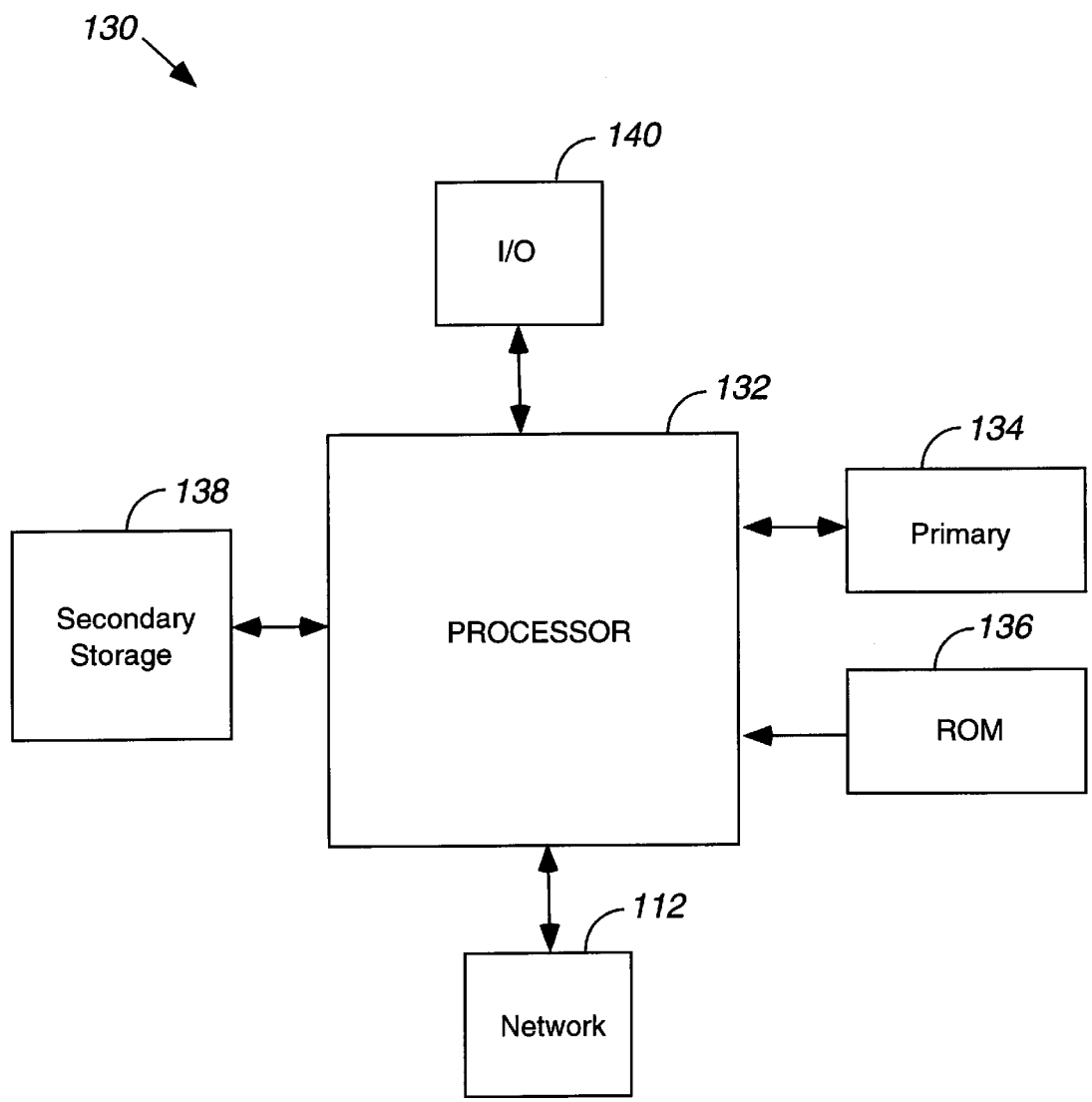
FIG. 1 is a diagrammatic representation of a computer system suitable for implementing the present invention.

FIG. 1 illustrates a typical, general purpose computer system suitable for implementing the present invention. The computer system 130 includes any number of processors 132 (also referred to as central processing units, or CPUs) that are coupled to memory devices including primary storage devices 134 (typically a read only memory, or ROM) and primary storage devices 136 (typically a random access memory, or RAM). As is well known in the art, ROM 134 acts to transfer data and instructions uni-directionally to the CPU 132, while RAM 136 is used typically to transfer data and instructions in a bi-directional manner. Both primary storage devices 134, 136 may include any suitable computer-readable media. A mass memory device 138 is also coupled bi-directionally to CPU 132 and provides additional data storage capacity. The mass memory device 138 may be used to store programs, data and the like and is typically a secondary storage medium such as a hard disk that is slower than primary storage devices 134, 136. Mass memory storage device 138 may take the form of a magnetic or paper tape reader or some other well-known device. It will be appreciated that the information retained within the mass memory device 138, may, in appropriate cases, be incorporated in standard fashion as part of RAM 136 as virtual memory. A specific mass storage device such as a CD-ROM 134 may also pass data uni-directionally to the CPU.

CPU 132 is also coupled to one or more input/output devices 140 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 132 optionally may be coupled to a computer or telecommunications network, e.g., an Internet network or an intranet network, using a network connection as shown generally at 112. With such a network connection, it is contemplated that the CPU 132 might receive information from the network, or might output information to the network in the course of performing the above-described method steps. The above-described devices and materials will be familiar to those of skill in the computer hardware and software arts.

Many application builder tools use software components which may be manipulated within an application builder tool in order to create an application. Software components which are customizable further enable a user to create highly customized applications. A Java™ Bean may be defined as a reusable, customizable, software component that may be visually moved, or manipulated, within a builder tool on a computer system. Builder tools generally include, but are not limited to, visual application builders and web page builders for use with an Internet network, or, more specifically, the aspect of an Internet network known as the World Wide Web. It should be appreciated that Java™ Beans may be simple elements, as for example graphic user interface elements such as buttons. Alternatively, Java™ Beans may be more complicated elements, as for example database viewers.

When applications are composed using application builder tools which manipulate software components, e.g., Java™ Beans, the application builder tool must analyze the components to first determine which methods, properties, and events are associated with the component, and to determine how to present the component. A Java™ Bean component that is a part of a Java™ Bean class may have an associated class which specifies details pertaining to the methods, properties, and events of the Java™ Bean that a builder tool may use to determine how to present, e.g., display, the Java™ Bean component. This class is known as a "BeanInfo" class, which may be considered to be an information class. The BeanInfo class typically includes strings which provide descriptive names that may be used to provide information about, or otherwise identify, the methods, properties, and events associated with a Java™ Bean. In general, a Java™ Bean will have a visual representation, or a representation that may be displayed as part of a graphical user interface. However, it should be appreciated that in some embodiments, the Java™ Bean will not have a visual representation, but will instead be modifiable using standard property sheets or the like.

As properties and events are typically identified by groupings of methods, a BeanInfo class, or an object that is a part of a BeanInfo class, generally includes methods that describe the Java™ Bean. Although the BeanInfo class may include any number of methods, in one embodiment, the BeanInfo class includes eight methods, which are as follows: a method which returns other BeanInfo objects which have information relating to the current, or associated, Java™ Bean ("getAdditionalBeanInfo"); a method which provides overall information about the current Java™ Bean ("getBeanDescriptor"); a method which returns an index of a default event ("getDefaultEventIndex"); a method which returns an index of a default property ("getDefaultPropertyIndex"); a method that returns an array which describes the events which may be exported by the current Java™ Bean ("getEventSetDescriptors"); a method that returns an array of externally visible, e.g., public, methods supported by the current Java™ Bean ("getMethodDescriptors"); and, a method that returns an array of editable properties supported by the current Java™ Bean ("getPropertyDescriptors").

An application builder tool or other tool which analyzes a Java™ Bean may be provided with an Introspector class that includes information relating to various design patterns and interfaces which are used with the process of introspection. Further, the Introspector class enables the BeanInfo object which describes a particular Java™ Bean to be obtained. In order to gather information relating to methods, properties, and events that are supported by a Java™ Bean, e.g., a target Java™ Bean, an Introspector typically analyzes the class, e.g., target class, with which the Java™ Bean is associated to determine if a corresponding BeanInfo class exists. In the event that a BeanInfo class exists, the Introspector uses information obtained from the BeanInfo class, in the determination of how to present the Java™ Bean.

It should be appreciated that in some embodiments, a BeanInfo class may not exist for a particular Java™ Bean. If a BeanInfo class does not exist, an application builder tool may identify the methods, properties, and events associated with the Java™ Bean by using an automatic analysis, or a combination of a "reflection" process and a "design pattern" analysis. A reflection process, as is well known to those skilled in the art, generally involves studying parts of a software component, e.g., a Java™ Bean, that is a part of a program at run-time to determine the methods that are associated with the software component. A design pattern is a pattern, or a syntax, that characterizes a particular method. Hence, a design pattern analysis is the analysis of syntaxes in order to identify the methods associated with a software component. As properties and events are usually identified by groupings of methods, a design pattern analysis also serves to identify properties and events. Generally, automatic analysis uses a reflection process, or mechanism, to determine methods that are supported by a Java™ Bean, then applies design patterns to determine, based on the methods, which properties, events, and public methods are supported. The use of automatic analysis enables methods and, therefore, properties and events, to be efficiently identified in the event that a BeanInfo class does not exist for a particular Java™ Bean. It should be appreciated, however, that even if a BeanInfo class exists, automatic analysis may also be used.

Figure 2:
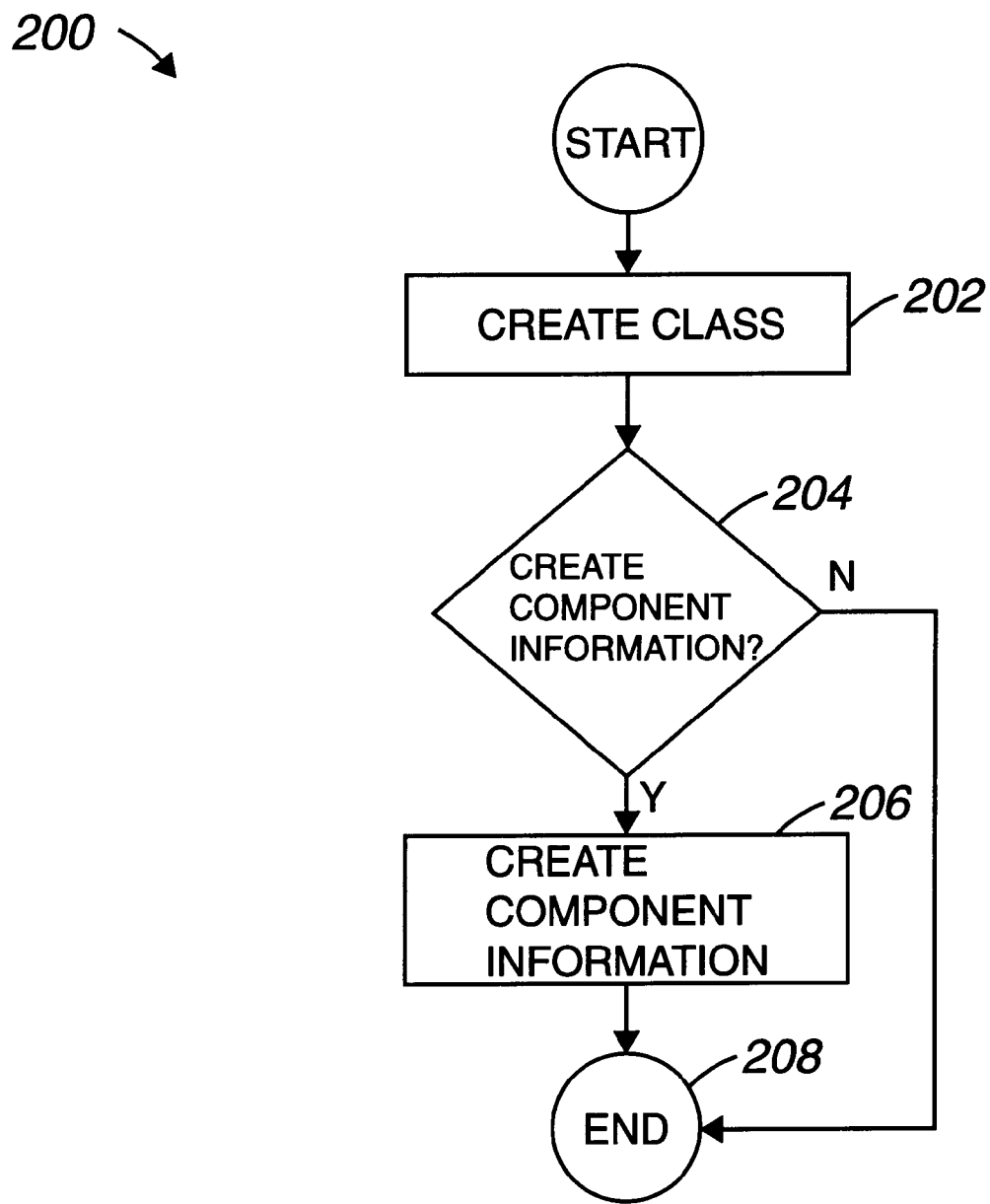
FIG. 2 is a process flow diagram which illustrates the steps associated with creating a new class in accordance with an embodiment of the present invention.

An application builder tool, as mentioned above, must typically analyze software components that are to be used within the application builder tool to determine which methods, properties, and events are associated with the component. If a component is to include information pertaining to methods, properties, and events with which the component is associated, at the time the class, i.e., the class from which the component is derived, is created, a class for the component information is also created. FIG. 2 is a process flow diagram which illustrates the steps associated with creating a new class in accordance with an embodiment of the present invention. Process 200 begins, and in a step 202, an object class is created. Although the class may be any suitable class, in the described embodiment, the class that is created is a Java™ Bean class. After the class is created, a determination is made in a step 204 regarding whether component information, or a catalog of interfaces provided by the class that are relevant to a given application construction tool, is to be created. The component information, or component information class, may generally include properties, methods and events for a component, or an instance of the class created in step 202. In the described embodiment, step 204 is essentially a determination regarding whether a "BeanInfo" object, as described above, is to be created. The determination of whether component information is to be created may be based on any suitable criteria. By way of example, a simulation of the component in an application construction tool may be performed to ascertain whether providing explicit component information is beneficial to the application construction tool.

If it is determined in step 204 that component information does not need to be created, then the process of creating a new class ends at 208. On the other hand, if it is determined in step 204 that the creation of component information is necessary or beneficial, the component information is created in a step 206. In the described embodiment, the BeanInfo object, which generally includes properties, methods, and events that describe the bean class, may specifically include a "getBeanDescriptor" method which provides overall information, e.g., a display name, about the bean class. After component information is created, the process of creating a new class is completed at 208.

As previously mentioned, an application construction tool which uses software components may introspect on the component to analyze how the component works. The component, which is a part of a class, is generally introspected on in order to determine the methods, properties, and events that are associated with the component. Once the application construction tool determines the methods, properties, and events that are associated with a component, the application construction tool may then present, e.g., visually display, the component.

The determination of which methods, properties, and events are associated with a class may occur sequentially, i.e., the methods, properties, and events may be identified in separate processes. Alternatively, the methods, properties, and events may be identified together as a part of a single process. One embodiment of identifying the methods, properties, and events sequentially will be described below with making reference to FIGS. 3, 4, and 8.

Figure 3:
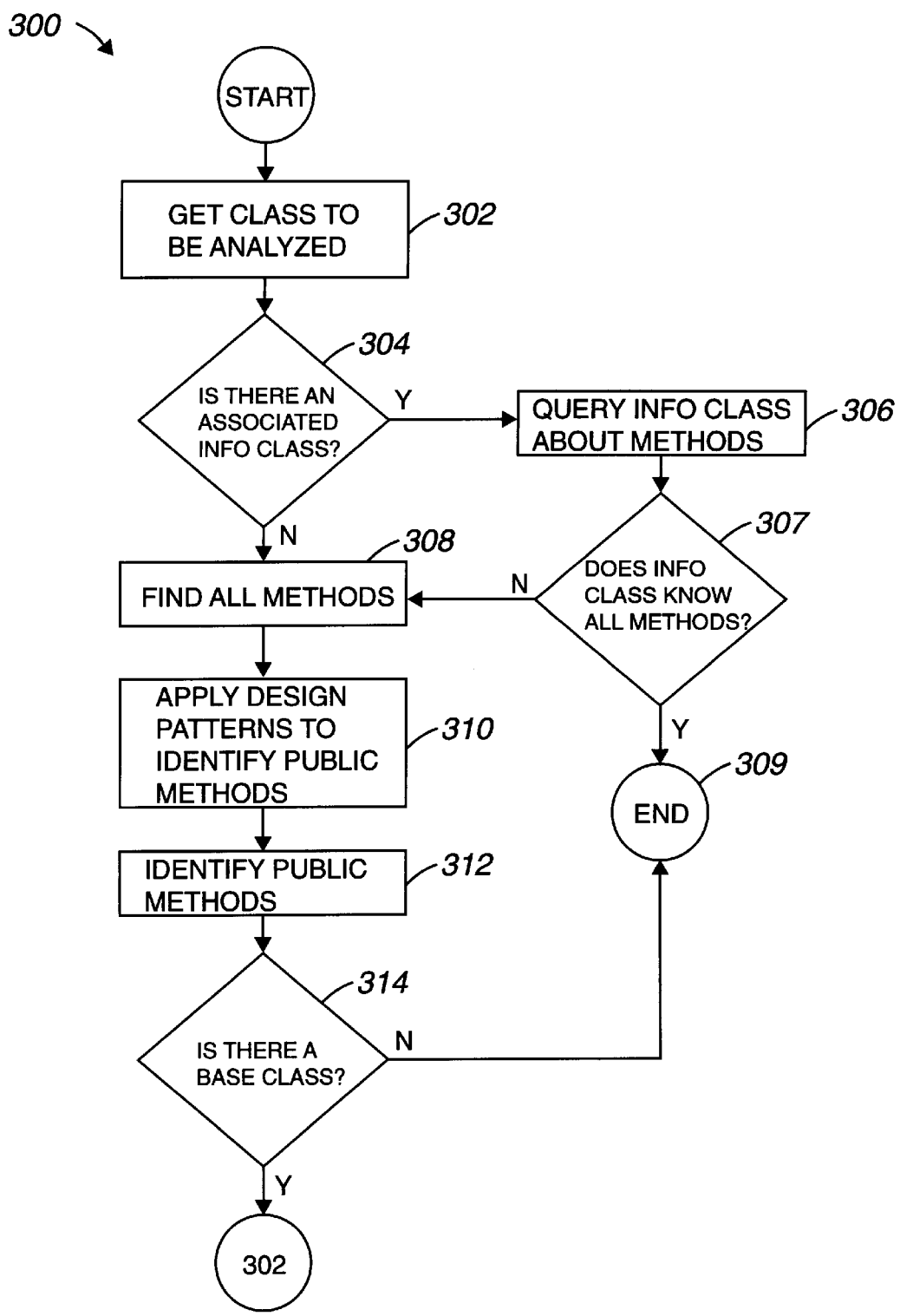
FIG. 3 is a process flow diagram which illustrates the steps involved with identifying methods associated with a class in accordance with an embodiment of the present invention.

FIG. 3 is a process flow diagram which illustrates the steps involved with identifying methods associated with a class which may include an information class in accordance with an embodiment of the present invention. Typically, methods which are associated with a class may be called from other components or classes. The process of identifying methods 300 begins, and in a step 302, the class to be analyzed is obtained. While the analysis of a class may be performed using any suitable application, in general, an application builder or similar tool is used to analyze the class. In the described embodiment, the class to be analyzed is a bean class. Once the class to be analyzed is obtained, a determination is made in a step 304 regarding whether an information (info) class, or a component information class, that is associated with the class to be analyzed exists.

If an associated component information class, e.g., a BeanInfo class in the described embodiment, is in existence, then in a step 306, the information class is queried about methods contained within the information class. In a step 307, it is determined whether the information class "knows," or includes, all methods associated with the class that is being analyzed. If it is determined that all methods are known to the information class, then the process of identifying methods associated with a class ends at 309. If it is determined that all methods are not known to the information class, then in a step 308, all methods associated with the class that is being analyzed are found. While any appropriate method may be used to find methods, a reflection process, or mechanism, is typically used to identify all methods associated with a class. As previously described, reflection involves studying different parts of a program, including the class that is being analyzed, at runtime to determine which methods, properties, and events are associated with the class.

After all methods are identified, design patterns are applied to identify public methods in a step 310. The design patterns are typically standard design patterns that may be used to identify public methods, or a sub-set of methods which may be exported, that are associated with the class that is being analyzed. The public methods are then identified in a step 312. Once the public methods are identified, in a step 314, a determination is made regarding whether there is a base class, or another class to be analyzed. When it is determined that the top-level base class has already been analyzed, then process flow moves from step 314 to 309 where the process of identifying methods is completed. If it is determined in step 314 that there is a base class, then the base class becomes the class to be analyzed, and process flow returns to step 302, the step of obtaining the class to be analyzed.

If it is determined in step 304 that an associated information class for the class to be analyzed does not exist, then the process flow proceeds from step 304 to step 308 in which all methods that are associated with the class to be analyzed are identified. In the described embodiment, the lack of an information class associated with the class to be analyzed implies that a BeanInfo class does not exist for the bean class that is to be analyzed.

Figure 4:
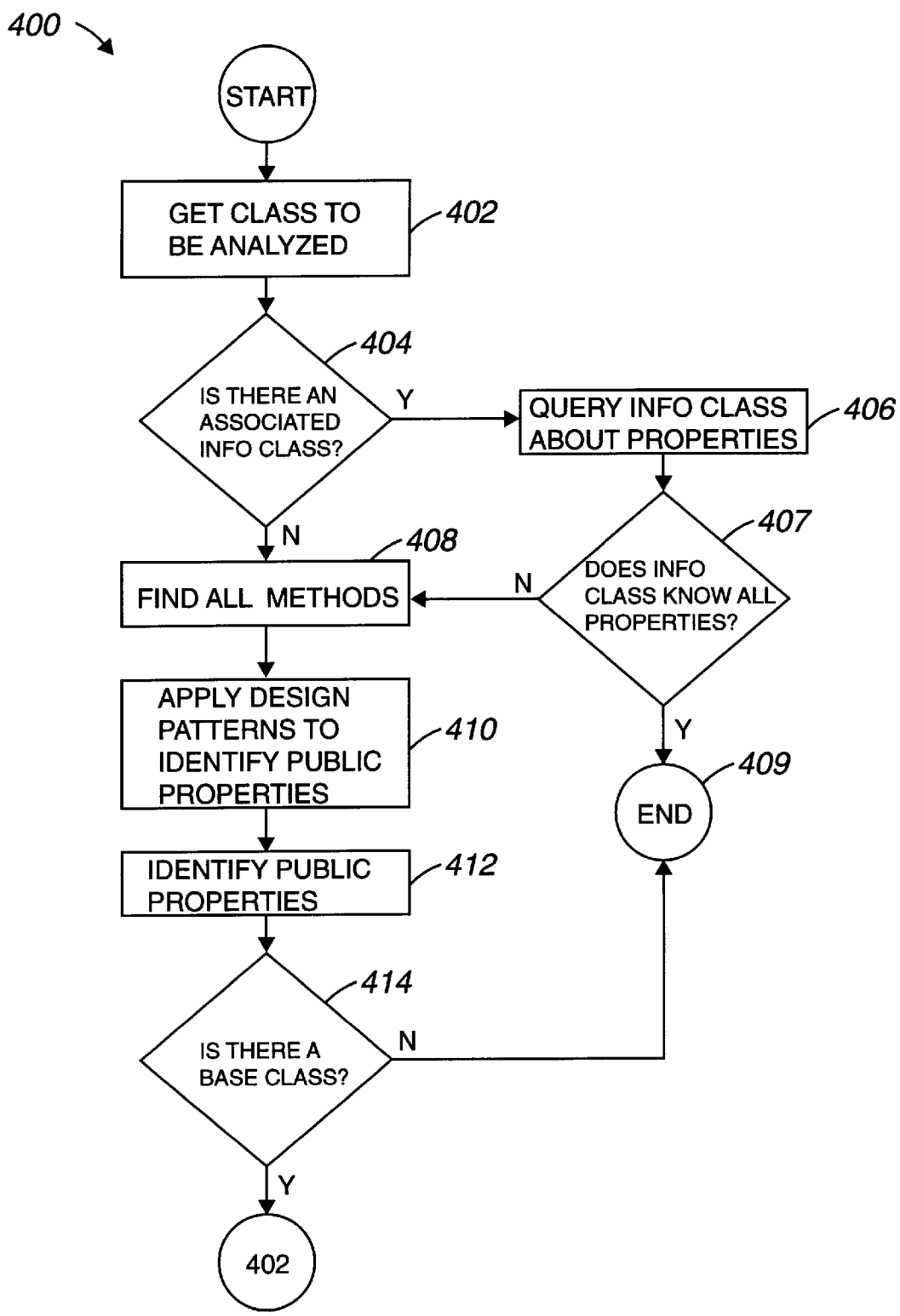
FIG. 4 is a process flow diagram which illustrates the steps involved with identifying properties associated with a class in accordance with an embodiment of the present invention.

FIG. 4 is a process flow diagram which illustrates the steps involved with identifying properties associated with a class in accordance with an embodiment of the present invention. Properties, which are generally named attributes associated with a class, may be read or written by calling appropriate methods which are associated with the class. It should be appreciated that properties may be widely varied. By way of example, properties may include, but are not limited to, simple properties, boolean properties, and indexed properties.

The process of identifying properties 400 begins, and in a step 402, the class to be analyzed is obtained. It should be appreciated that typically, an application builder or similar tool is used to analyze the class. In the described embodiment, the class to be analyzed is a bean class. Once the class to be analyzed is obtained, a determination is made in a step 404 regarding whether an information (info) class, or a component information class, that is associated with the class to be analyzed exists.

If an associated component information class is in existence, then in a step 406, the information class is queried about properties contained within the information class. In a step 407, it is determined whether the information class "knows," or includes, all properties associated with the class that is being analyzed. If it is determined that all properties are known to the information class, then the process of identifying properties associated with a class ends at 409. If it is determined that all properties are not known to the information class, all methods associated with the class that is being analyzed are found in a step 408. While any appropriate method may be used to find methods, a reflection mechanism is typically used to identify the methods associated with a class.

After all methods are identified, design patterns are applied to identify public properties in a step 410. As previously mentioned, properties may include simple properties, boolean properties, and indexed properties. Public properties are properties which may be exported to other classes. The steps associated with using design patterns to identify public simple properties will be described in more detail below with respect to FIG. 5, while the steps associated with applying design patterns to identify public boolean properties and public indexed properties will be discussed in more detail below with reference to FIGS. 6 and 7, respectively. After the design patterns are applied in step 410, the public properties are identified in a step 412.

Once public properties are identified, a determination is made regarding whether there is a base class in a step 414. When it is determined that there are no remaining base classes, i.e., that the top-level base class has already been analyzed, then the process of identifying properties is completed at 409. If it is determined in step 414 that a base class remains, then process flow returns to step 402 in which the base class is obtained as the class to be analyzed.

If it is determined in step 404 that an associated information class for the class to be analyzed does not exist, then the process flow proceeds from step 404 to step 408 in which all properties that are associated with the class that is being analyzed are identified. In the described embodiment, the lack of an information class associated with the class to be analyzed implies that a BeanInfo class does not exist for the bean class that is to be analyzed.

Figure 5:
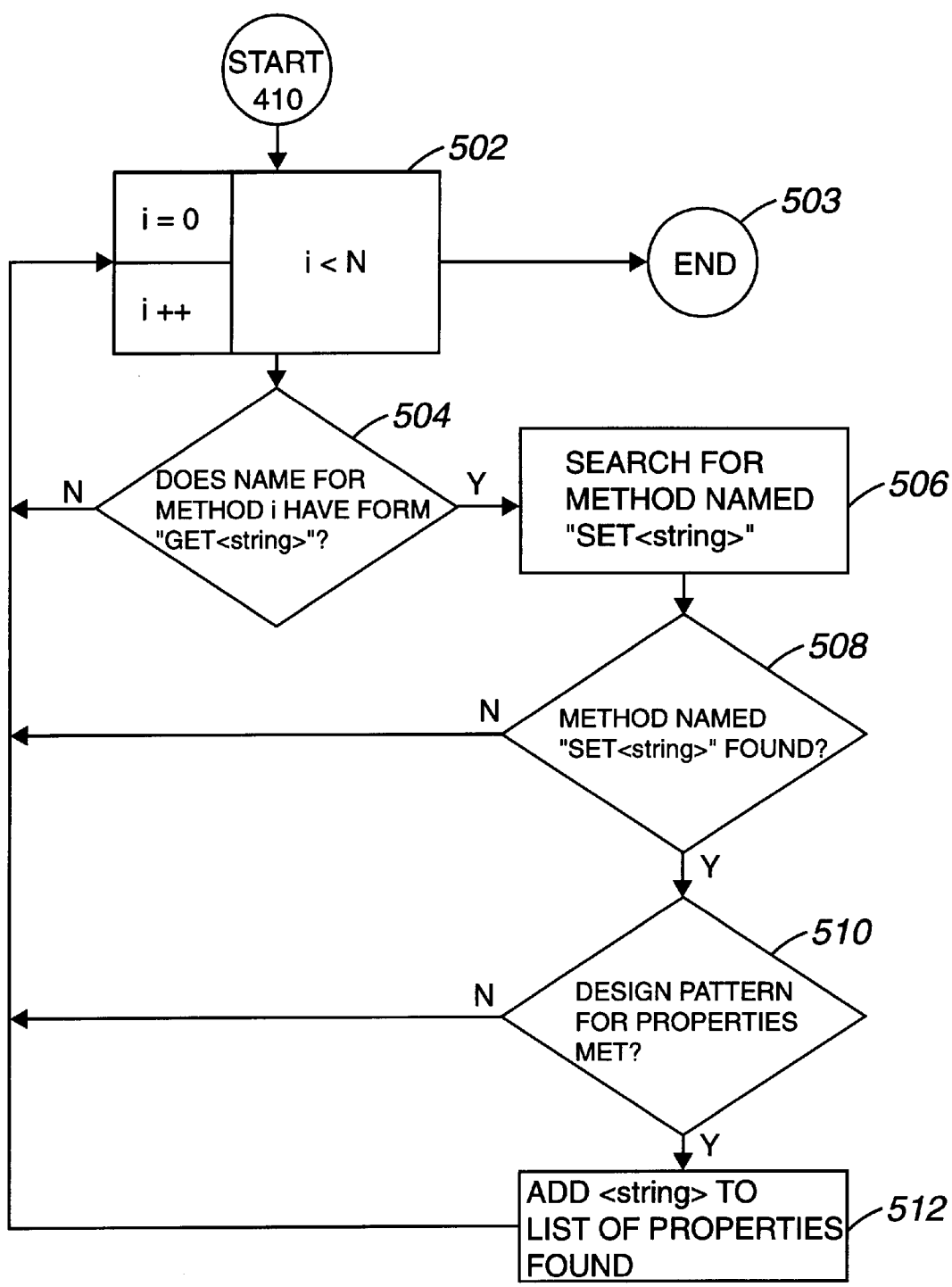
FIG. 5 is a process flow diagram which illustrates the steps involved with applying design patterns to identify public simple read-write properties in accordance with an embodiment of the present invention.

With reference to FIG. 5, the steps associated with applying design patterns to identify public simple read-write properties will be described in accordance with an embodiment of the present invention. A simple read-write property is one type of simple property, and is generally identified by a "set" method and a "get" method. By way of example, a simple property "foo" may be identified, or located, by looking for "getFoo" and "setFoo" methods. Other simple properties include, but are not limited to, read-only properties and write-only properties.

One embodiment of a process of applying design patterns to identify public simple read-write properties begins in a step 502 where the process enters a loop where a variable "i" is incremented. In other words, a counter is used to track the number of methods which are to be checked in the identification of public simple read-write properties. The loop is a loop through all methods "i" that may be associated with the class that is being analyzed. If there are no methods to be checked, or, alternatively, if all available methods have been checked, then the process of identifying simple read-write properties ends at 503. In a step 504, a determination is made regarding whether method "i" has the form "get<string>", where "<string>" is generally the name of the simple property that is to be located. As mentioned above, a simple read-write property may typically be identified by a set method and a get method. If the determination in step 504 is that method "i" does not have the form "get<string>", then process flow loops back to step 502 where "i", or a counter, is incremented, and the next method, if any, is obtained.

If the determination in step 504 is that method "i" does indeed have the form "get<string>", then in a step 506, a search is made for a method named "set<string>", where "<string>" is the same in both "get<string>" and "set<string>". It should be appreciated that any suitable algorithm may be employed to search for a method named "set<string>" which may be located in the same class the method named "get<string>". In a step 508, it is determined whether a method named "set<string>" has been found. If a method named "set<string>" has not been found, process flow returns to step 502 where "i" is incremented. It should be understood that when only a method named "get<string>" has been found, the property identified as "<string>" may be a read-only property. Alternatively, if a method named "set<string>" has been found, then in a step 510, a determination is made as to whether the design pattern for a simple read-write property has been met. Although the design pattern for a simple read-write property may take on any suitable form, in the described embodiment, the design pattern is such that "set<string>" returns a void and has one argument, while "get<string>" returns a result, which is of the same type as the argument to "set<string>", and has no arguments.

If the design pattern for the simple read-write property has not been met, then process flow returns to step 502 where "i" is incremented. If the design pattern for the simple read-write property has been met, then "<string>" is added to a list of all simple read-write properties found. After "<string>" is added to the list of all simple read-write properties found, process flow returns to step 502 where "i" is incremented. Steps 502 through 512 are repeated until no more methods remain to be checked to determine if method "i" has the form "get<string>". When no more methods remain to be checked, then the process of finding simple read-write properties ends at 503.

Figure 6:
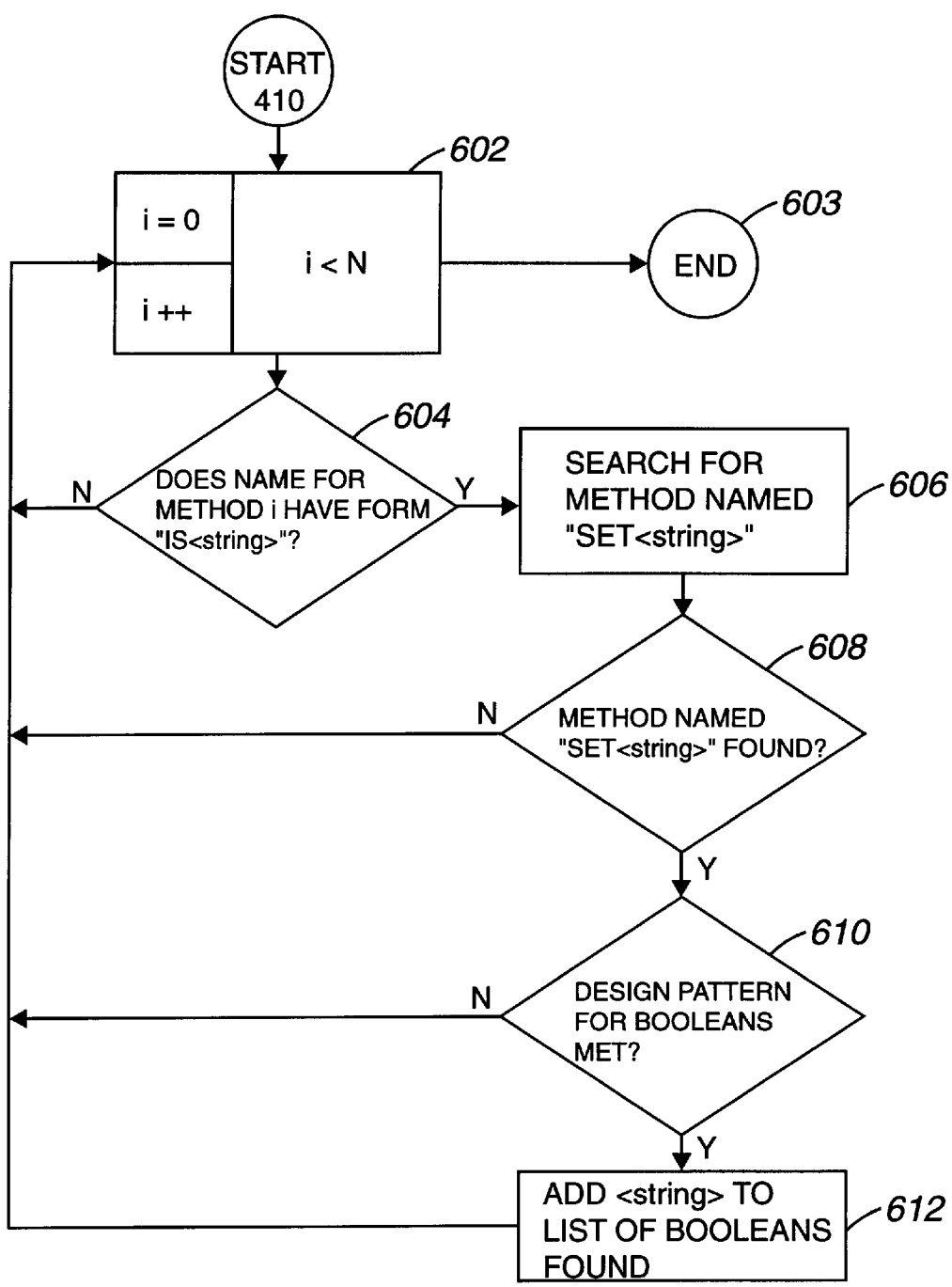
FIG. 6 is a process flow diagram which illustrates the steps involved with applying design patterns to identify public boolean properties in accordance with an embodiment of the present invention.

Referring next to FIG. 6, the steps associated with applying design patterns to identify public boolean properties will be described in accordance with an embodiment of the present invention. In one embodiment, a boolean property may usually be identified by the presence of an "is" method and a corresponding "set" method. In some cases, a corresponding "get" method may also be present in addition to an "is" method. A boolean property, as for example a boolean property named "booleanprop", may be identified, or located, by looking for "isBooleanprop" and "setBooleanprop" methods.

One embodiment of a process of applying design patterns to identify public boolean properties begins in a step 602 where the process enters a loop where a variable "i" is incremented. The loop is a loop through all methods "i" that may be associated with the class that is being analyzed. If there are no methods to be checked, or if all available methods have been checked, then the process of identifying boolean properties ends at 603. In a step 604, a determination is made regarding whether method "i" has the form "is<string>". If the determination in step 604 is that method "i" does not have the form "is<string>", then process flow loops back to step 602 where "i" is incremented.

If the determination in step 604 is that method "i" has the form "is<string>", then in a step 606, a search is made for a method named "set<string>", where "<string>" is the same in both "is<string>" and "set<string>". It should be appreciated that any suitable algorithm may be employed to search for a method named "set<string>". In a step 608, it is determined whether a method named "set<string>" has been found. If a method named "set<string>" has not been found, process flow returns to step 602 where "i" is incremented. However, if a method named "set<string>" has been found, then in a step 610, a determination is made regarding whether the design pattern for a boolean property has been met. It should be appreciated that the design pattern for a boolean property may take on any suitable form. By way of example, in the described embodiment, the design pattern may be such that "set<string>" returns a void and has one boolean argument, while "is<string>" returns a boolean, and has no arguments.

If the design pattern for a boolean property has not been met, then process flow returns to step 602 where "i" is incremented. On the other hand, if the design pattern for a boolean property has been met, then "<string>" is added to a list of all boolean properties found in a step 612. After "<string>" is added to the list of all boolean properties found, process flow returns to step 602 where "i" is incremented. Steps 602 through 612 are repeated until no more methods remain to be checked to determine if method "i" has the form "is<string>". When no more methods remain to be checked, then the process of finding boolean properties ends at 603.

Figure 7:
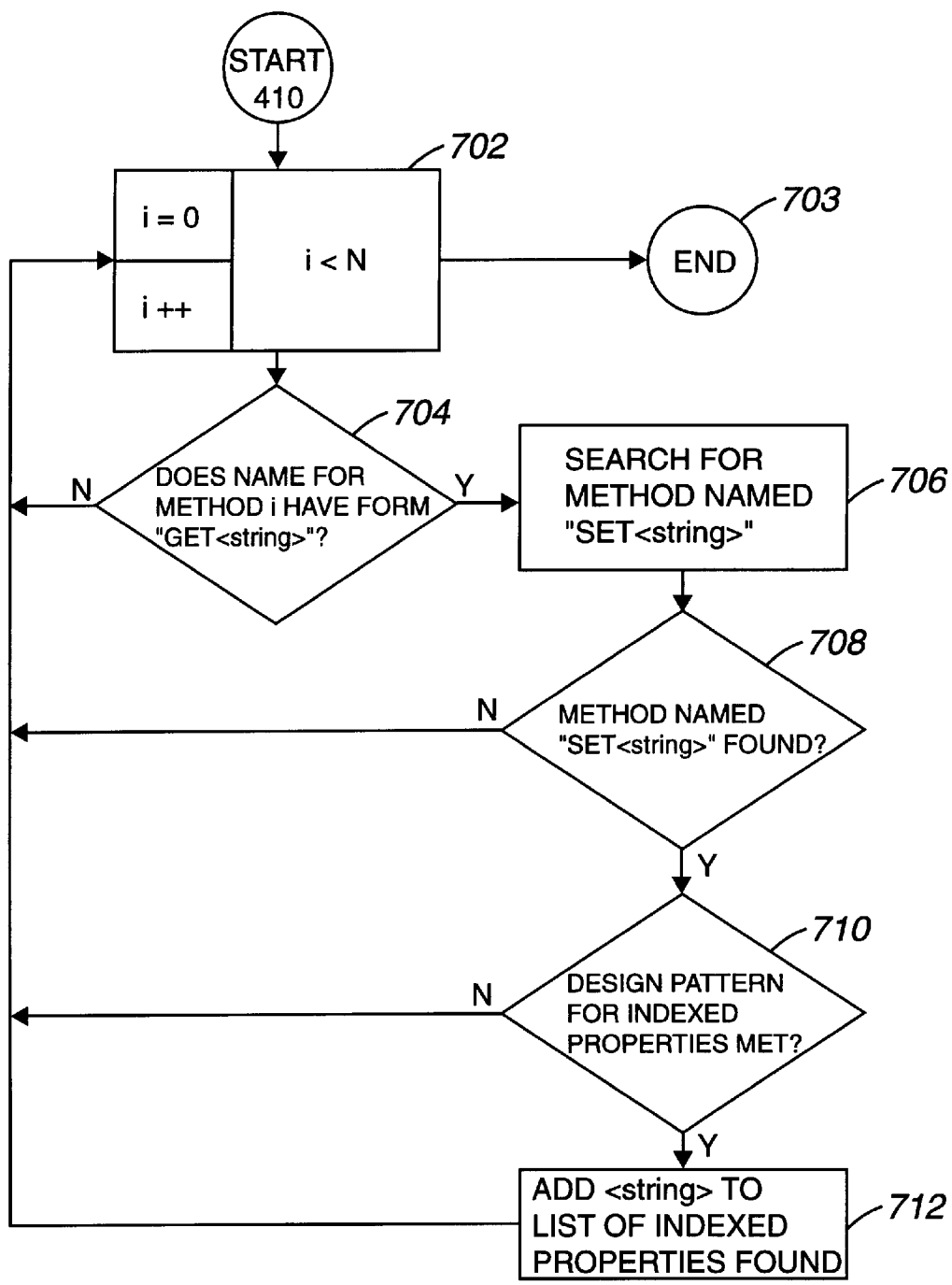
FIG. 7 is a process flow diagram which illustrates the steps involved with applying design patterns to identify public indexed properties in accordance with an embodiment of the present invention.

Referring next to FIG. 7, the steps associated with applying design patterns to identify public indexed properties will be described in accordance with an embodiment of the present invention. An indexed property is a property whose type is an array, and may generally be identified by a "set" method and a "get" method. By way of example, an indexed property "indexprop" may be identified, or located, by looking for "getIndexprop" and "setIndexprop" methods.

The process of applying design patterns to identify public indexed properties, in accordance with one embodiment, begins in a step 702 where the process enters a loop where a variable "i" is incremented. The loop is a loop through all methods "i" that may be associated with the class that is being analyzed. If there are no methods to be checked, or, alternatively, if all available methods have been checked, then the process of identifying indexed properties ends at 703. In a step 704, a determination is made regarding whether method "i" has the form "get<string>". As mentioned above, an indexed property may typically be identified by a set method and a get method. If the determination in step 704 is that method "i" does not have the form "get<string>", then process flow loops back to step 702 where "i" is incremented.

If the determination in step 704 is that method "i" does indeed have the form "get<string>", then in a step 706, a search is made for a method named "set<string>", where "<string>" is the same in both "get<string>" and "set<string>". It should be appreciated that any suitable algorithm may be employed to search for a method named "set<string>" which may be located in the same class the method named "get<string>". In a step 708, it is determined whether a method named "set<string>" has been found. If a method named "set<string>" has not been found, process flow returns to step 702 where "i" is incremented. Alternatively, if a method named "set<string>" has been found, then in a step 710, a determination is made as to whether the design pattern for indexed properties has been met. Although the design pattern for indexed properties may take on any suitable form, in the described embodiment, the design pattern is such that "get<string>" returns a result and takes one integer argument, while "set<string>" returns a void, and takes two arguments, the first being an integer, and the second being of the same type as the result returned by "get<string>".

If the design pattern for indexed properties has not been met, then process flow returns to step 702 where "i" is incremented. If the design pattern for the indexed properties has been met, then in a step 712, "<string>" is added to a list of indexed properties found. After "<string>" is added to the list of all indexed properties found, process flow returns to step 702 where "i" is incremented. Steps 702 through 712 are repeated until no more methods remain to be checked to determine if method "i" has the form "get<string>". When no more methods remain to be checked, then the process of finding simple properties ends at 703.

Figure 8:
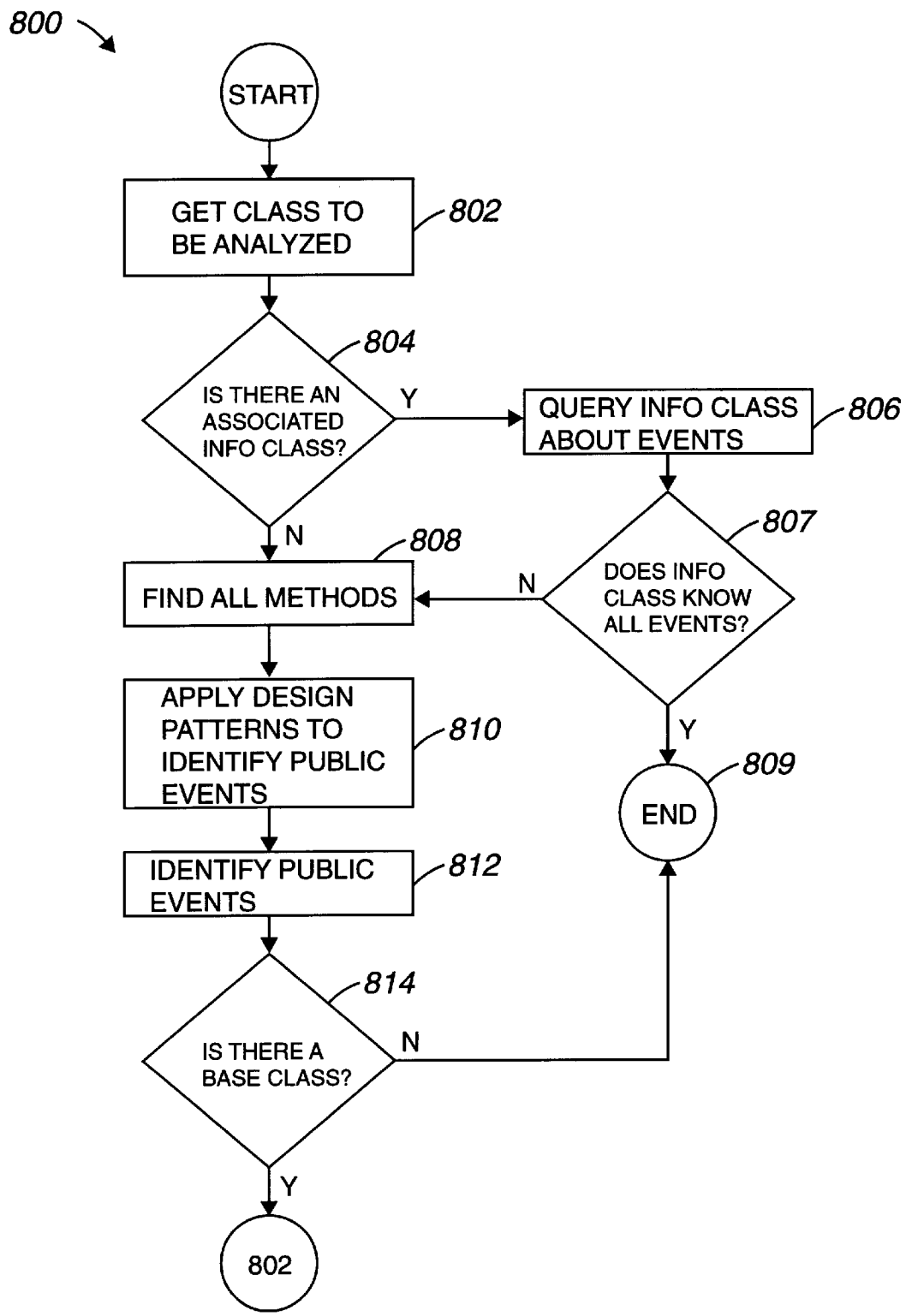
FIG. 8 is a process flow diagram which illustrates the steps involved with identifying events associated with a class in accordance with an embodiment of the present invention.

Once methods and properties associated with a class are identified, in one embodiment, the events associated with the class are then identified. FIG. 8 is a process flow diagram which illustrates the steps involved with identifying events associated with a class in accordance with an embodiment of the present invention. Events typically provide a way for one component to notify other components that something of interest has occurred. The process of identifying events 800 begins, and in a step 802, the class to be analyzed is obtained. As previously mentioned, the analysis of a class may be performed using any suitable application, as for example an application builder. Although the class to be analyzed may be any suitable class, in the described embodiment, the class to be analyzed is a bean class. Once the class to be analyzed is obtained, a determination is made in a step 804 regarding whether an information (info) class, or a component information class, that is associated with the class to be analyzed exists.

If an associated component information class is in existence, then in a step 806, the information class is queried about events contained within the information class. In a step 807, it is determined whether the information class includes all events associated with the class that is being analyzed. If it is determined that all events are known to the information class, then the process of identifying events associated with a class ends at 809. If it is determined that all events are not known to the information class, then in a step 808, all methods associated with the class that is being analyzed are found. While any appropriate method may be used to find methods, a reflection mechanism is typically used to identify all events associated with a class. As previously described, reflection involves studying different parts of a program at runtime to determine which methods, properties, and events are associated with the class.

After all methods are identified, design patterns are applied to identify public events in a step 810. The design patterns may be standard design patterns that may be used to identify public events that are associated with the class that is being analyzed. A public event is an event that is accessible to, e.g., may be exported to, classes other than the class with which the public event is associated. One suitable process of identifying public events will be described in more detail below with respect to FIG. 9. The public events are then identified in a step 812. Once the public events are identified, in a step 814, a determination is made regarding whether there is a base class. When it is determined that the top-level base class has already been analyzed, then process flow moves from step 814 to 809 where the process of identifying events is completed. If it is determined in step 814 that there is a base class, then the base class becomes the class to be analyzed, and process flow returns to step 802, the step of obtaining the class to be analyzed.

If it is determined in step 804 that an associated information class for the class to be analyzed does not exist, then the process flow proceeds from step 804 to step 808 in which all events that are associated with the class to be analyzed are identified. In the described embodiment, the lack of an information class associated with the class to be analyzed implies that a BeanInfo class does not exist for the bean class that is to be analyzed.

Figure 9:
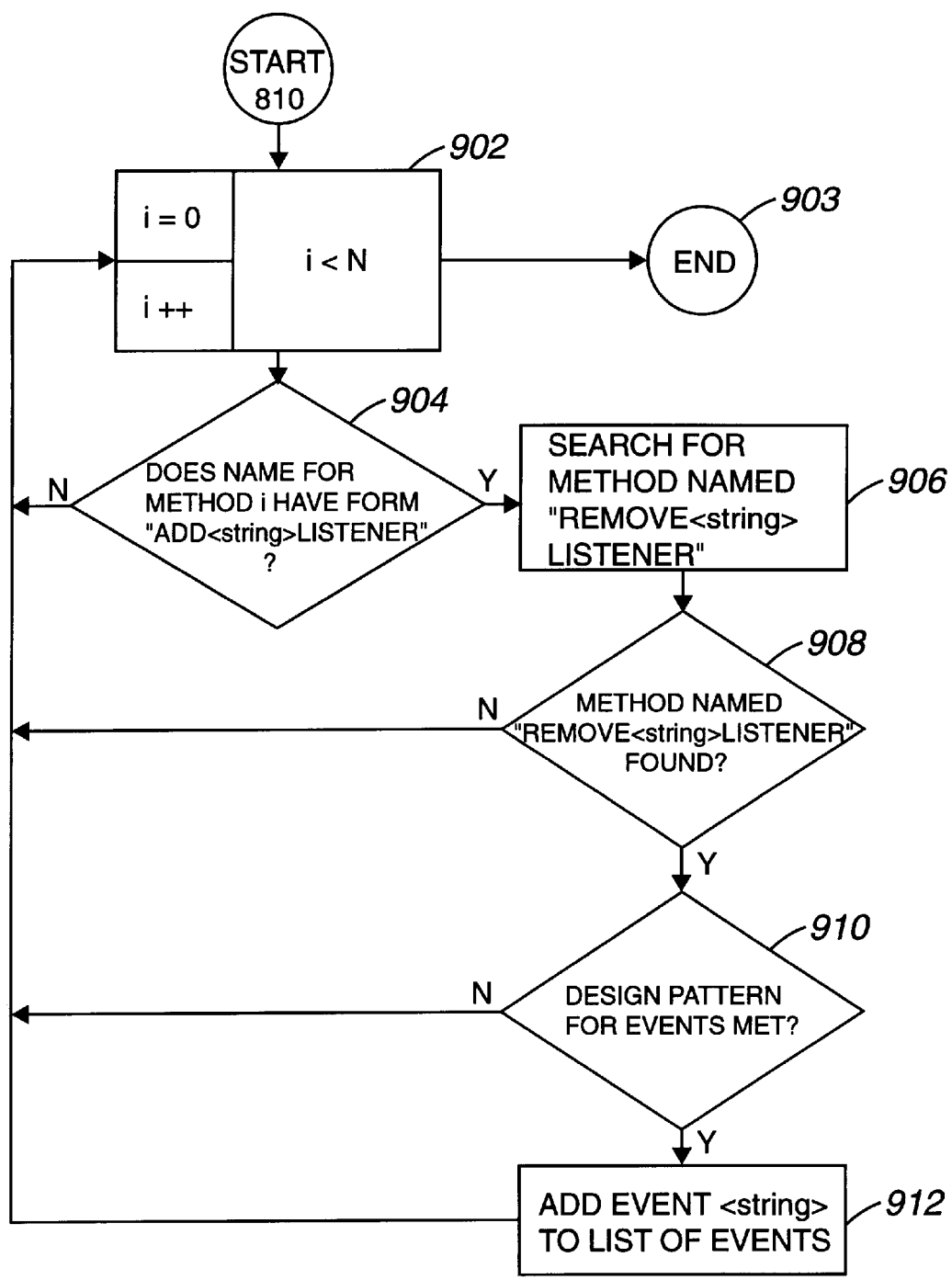
FIG. 9 is a process flow diagram which illustrates the steps involved with identifying public events associated with events in accordance with an embodiment of the present invention.

Referring next to FIG. 9, the steps associated with applying design patterns to identify public events will be described in accordance with an embodiment of the present invention. One embodiment of a process of applying design patterns to identify public events begins in a step 902, the process enters a loop where a variable "i" is incremented. The loop is a loop through all methods "i" that may be associated with the class that is being analyzed. If there are no methods to be checked, or, alternatively, if all available methods have been checked, then the process of identifying public events ends at 903 and, process flow moves to step 812 of FIG. 8. In a step 904, a determination is made regarding whether method "i" has the form "add<string>listener". In general, an event may be identified by an add method and a remove method. If the determination in step 904 is that method "i" does not have the form "add<string>listener", then process flow loops back to step 902 where "i" is incremented.

If the determination in step 904 is that method "i" does indeed have the form "add<string>listener", then in a step 906, a search is made for a method named "remove<string>listener", where "<string>" is the same in both "add<string>listener" and "remove<string>listener". It should be appreciated that any suitable algorithm may be employed to search for a method named "add<string>listener" which may be located in the same class the method named "add<string>listener". In a step 908, it is determined whether a method named "remove<string>listener" has been found. If a method named "remove<string>listener" has not been found, process flow returns to step 902 where "i" is incremented. Alternatively, if a method named "remove<string>listener" has been found, then in a step 910, a determination is made as to whether the design pattern for a public event has been met. Although the design pattern for a public event may take on any suitable form, in the described embodiment, the design pattern is such that "add<string>listener" returns a void and has one argument, and "remove<string>listener" returns a void and has one argument which is of the same type as the argument to "add<string>listener".

If the design pattern for a public event has not been met, then process flow returns to step 902 where "i" is incremented. If the design pattern for the public event has been met, then "<string>" is added to a list of all public events found in a step 912. After "<string>" is added to the list of all public events found, process flow returns to step 902 where "i" is incremented. Steps 902 through 912 are repeated until no more methods remain to be checked to determine if method "i" has the form "add<string>listener". When no more methods remain to be checked, then the process of finding public events ends at 903.

Although only a few embodiments of the present invention have been described, it should be understood that the present invention may be embodied in many other specific forms without departing from the spirit or the scope of the present invention. By way of example, the processes of identifying simple properties, boolean properties, and indexed properties may be combined into a single process. Further, steps involved with analyzing classes may be reordered. Steps may also be removed or added without departing from the spirit or the scope of the present invention. Therefore the described embodiments should be taken as illustrative and not restrictive, and the invention should be defined by the following claims and their full scope of equivalents.

What is claimed is:

1. A method of analyzing a software component that can be visually moved within an application builder tool running on a computer, the software component being a part of a first class, the method comprising:

obtaining the software component to be analyzed;

determining if the software component has an associated information class;

querying the information class about information stored within the information class when it is determined that the software component has the associated information class, the information stored within the information class being related to at least one of methods, properties, and events;

identifying a set of methods associated with the first class when it is determined that the software component does not have the associated information class;

applying at least one design pattern to identify a first property associated with the software component when it is determined that the software component does not have the associated information class, the first property being a part of a set of properties associated with said first class, wherein applying the at least one design pattern includes searching for at least one method which defines the first property, and searching for the at least one method which defines the first property includes determining whether the first property meets the design pattern and adding the first property to a list of properties associated with the software component when it is determined that the first property the design pattern; and identifying the first property associated with the software component when it is determined that the software component does not have the associated information class.

2. A method of analyzing a software component as recited in claim 1 wherein said first property is one of a simple property, a boolean property, and an indexed property.

3. A method of analyzing a software component as recited in claim 1 including a first method and a second method which define said first property, the first method being a get method and the second method being a set method.

4. A method of analyzing a software component that can be visually moved within an application builder tool running on a computer, said software component being a part of a first class, the method comprising:

obtaining said software component to be analyzed;

determining if said software component has an associated information class;

querying said information class, about information stored within said information class when it is determined that said software component has said associated information class, wherein said information class is arranged to include details associated with visually displaying the software component; and when is is determined that said software component does not have an associated information class, identifying a set of methods associated with the first class, applying at least one design pattern to identify a first event associated with said software component, said first event being a part of said set of events associated with said first class, and identifying said first event associated with said software component, wherein applying at least one design pattern to identify said first event associated with said software component includes searching for at least one method which defines said first event, and wherein searching for said at least one method which defines said first event includes searching for an add method and searching for a remove method which define said first event, determining whether said first event meets said design pattern, and adding said first event to a list of events associated with said software component when it is determined that said first event meets said design pattern.

5. A method of analyzing a software component that can be visually moved within an application builder tool running on a computer, the software component being a part of a first class, the method comprising:

obtaining the software component to be analyzed;

identifying a set of methods associated with the first class;

applying at least one design pattern to identify a first property associated with the software component, wherein applying the at least one design pattern to identify the first property includes searching for at least one method which defines the first property, and searching for the at least one method which defines the first property includes determining whether the first property meets the design pattern and adding the first property to a list of properties associated with the software component when it is determined that the first property meets the design pattern, the first property being a part of a set of properties associated with the first class; and identifying the first property associated with the software component.

6. A method of analyzing a software component as recited in claim 5 wherein said first property is one of a simple property, a boolean property, and an indexed property.

7. A method of analyzing a software component as recited in claim 6 including a first method and a second method which define said first property, the first method being a get method and the second method being a set method.

8. A method of analyzing a software component that can be visually moved within an application builder tool running on a computer, said software component being a part of a first class, the method comprising:

obtaining said software component to be analyzed;

identifying a set of methods associated with said first class;

applying at least one design pattern to identify a first property associated with said software component, said first property being a part of a set of properties associated with said first class;

identifying said first property associated with said software component;

applying at least one design pattern to identify a first event associated with said software component, said first event being a part of a set of events associated with said first class, wherein applying at least one design pattern to identify said first event associated with the software component includes searching for at least one method which defines said first event, wherein searching for said at least one method which defines said first event includes searching for an add method and searching for a remove method which define said first event, determining whether said first event meets said design pattern, and adding said first event to a list of events associated with said software component when it is determined that said first event meets said design pattern; and identifying said first event associated with said software component.

9. A computer system for collecting information associated with a software component comprising:

a computer coupled with at least one memory device which holds therein a builder tool, said builder tool running on said computer, said builder tool being arranged to analyze said software component, said computer being arranged to:

obtain said software component to be analyzed by said builder tool, said software component being a part of a first class, said software component being visually manipulatable within said builder tool;

determine if said software component has an associated information class, said information class including at least one of methods, properties, and events;

query said information class about information stored within said information class when it is determined that said associated information class is in existence, the information stored within said information class being arranged to include details associated with visually displaying said software component identify a set of properties associated with said first class when it is determined that said associated information class is not in existence;

apply at least one design pattern to identify a first property associated with said software component, said first property being a part of said set of properties associated with said first class;

identify said first property associated with said software component; and search for at least one method which defines said first property, wherein said computer is further arranged to search for at least one method which defines said first property by determining whether said first property meets said design pattern, and adding said first property to a list of properties associated with said software component when it is determined that said first property meets said design pattern.

10. A computer system for collecting information associated with a software component comprising:

a computer coupled with at least one memory device which holds therein a builder tool, said builder tool running on said computer, said builder tool being arranged to analyze said software component, said computer being arranged to:

obtain said software component to be analyzed by said builder tool, said software component being a part of a first class, said software component being visually manipulatable within said builder tool;

determine if said software component has an associated information class, said information class including at least one of methods, properties, and events;

query said information class about information stored within said information class when it is determined that said associated information class is in existence, the information stored within said information class being arranged to include details associated with visually displaying said software component;

identify a set of methods associated with said first class when it is determined that said associated information class is not in existence;

apply at least one design pattern to identify a first event associated with said software component, said first event being a part of said set of events associated with said first class;

identify said first event associated with said software component; and search for at least one method which defines said first event, wherein said search for at least one method which defines said first event includes determining whether said first event meets said design pattern, and adding said first property to a list of events associated with said software component when it is determined that said first event meets said design pattern.

11. A computer-readable medium comprising computer-readable program code devices configured to cause a computer to:

run a software program on said computer, said software program being an application builder tool;

obtain a software component to be analyzed by said software program, said software component being a part of a first class, said software component being visually manipulatable within said software program;

determine if said software component has an associated information class, said information class including at least one of methods, properties, and events;

query said information class about information stored within said information class when it is determined that said associated information class is in existence, wherein said information class is arranged to include details associated within visually displaying said software component;

identify a set of properties associated with said first class when it is determined that said associated information class is not in existence;

apply at least one design pattern to identify a first property associated with said software component, said first property being a part of said set of properties associated with said first class;

identify said first property associated with said software component; and search for at least one method which defines said first property, wherein the program code devices arranged to search for at least one method which defines said first property are further arranged to determine whether said first property meets said design pattern and to add said first property to a list of properties associated with said software component when it is determined that said first property meets said design pattern.

12. A computer-readable medium comprising computer-readable program code devices configured to cause a computer to:

run a software program on said computer, said software program being an application builder tool;

obtain a software component to be analyzed by said software program, said software component being a part of a first class, said software component being visually manipulatable within said software program;

determine if said software component has an associated information class, said information class including at least one of methods, properties, and events;

query said information class about information stored within said information class when it is determined that said associated information class is in existence, wherein said information class is arranged to include details associated within visually displaying said software component;

identify a set of methods associated with said first class when it is determined that said associated information class is not in existence;

apply at least one design pattern to identify a first event associated with said software component, said first event being a part of said set of events associated with said first class;

identify said first event associated with said software component; and search for at least one method which defines said first event, wherein the program code devices arranged to search for at least one method which defines said first event are further arranged to determine whether said first event meets said design pattern, and to add said first event to a list of events associated with said software component when it is determined that said first event meets said design pattern.

* * * * *